(No Model.)　　　　　　W. BEDDOWS.　　　　　　2 Sheets—Sheet 1.
RABBETING PLANE.
No. 512,147.　　　　　　　　Patented Jan. 2, 1894.
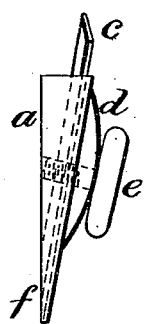
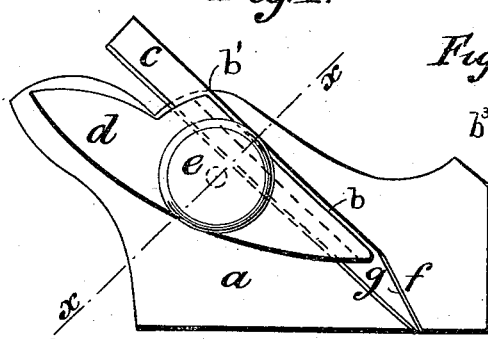
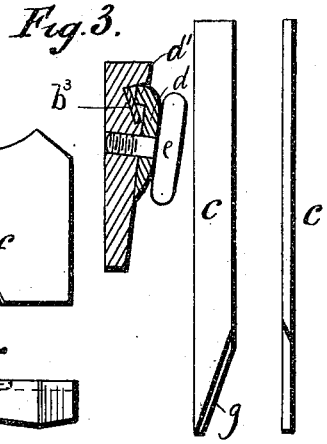
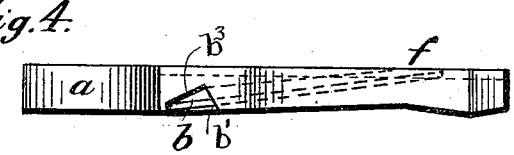
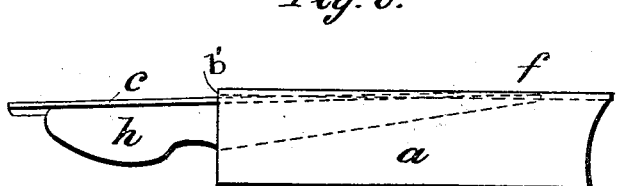
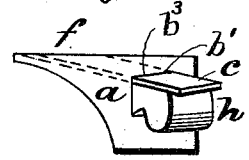
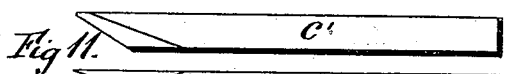
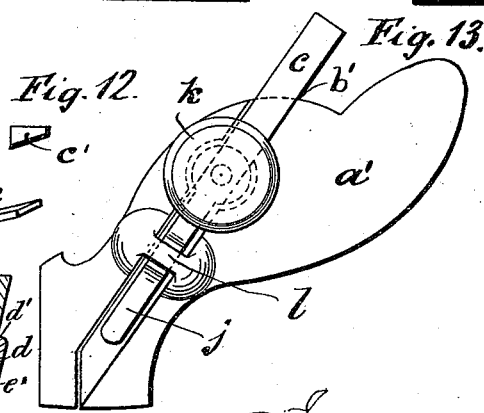
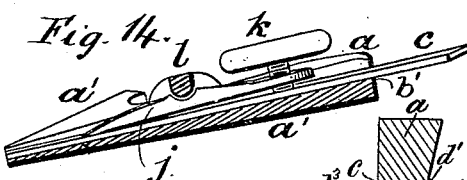
Witnesses:—　　　　　　　　　　Inventor:
J. A. Rutherford　　　　　　　William Beddows
William Gaskin　　　　　　　By James L. Norris
　　　　　　　　　　　　　　　　　Attorney.
THE NATIONAL LITHOGRAPHING COMPANY,
WASHINGTON, D. C.

(No Model.) 2 Sheets—Sheet 2.
W. BEDDOWS.
RABBETING PLANE.
No. 512,147. Patented Jan. 2, 1894.
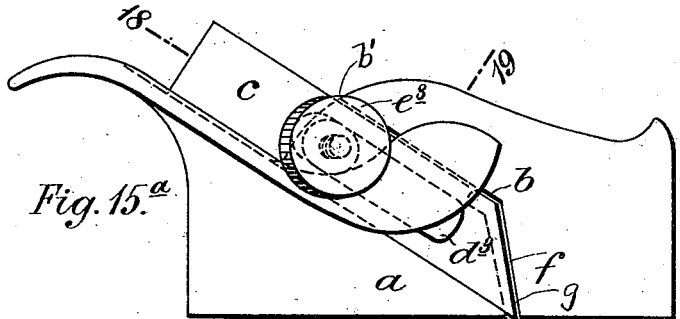
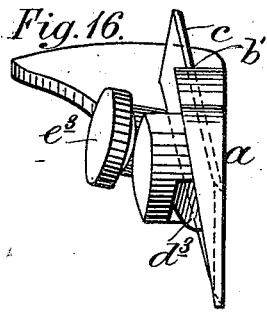
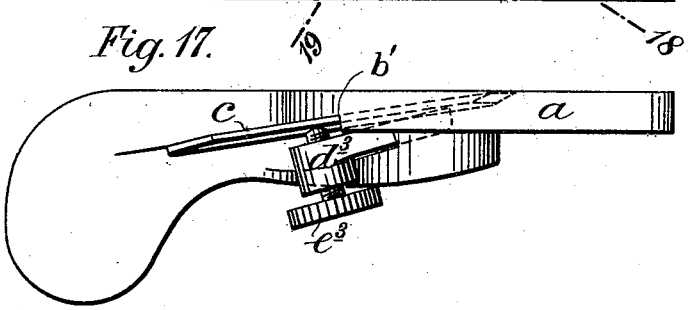
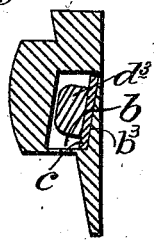
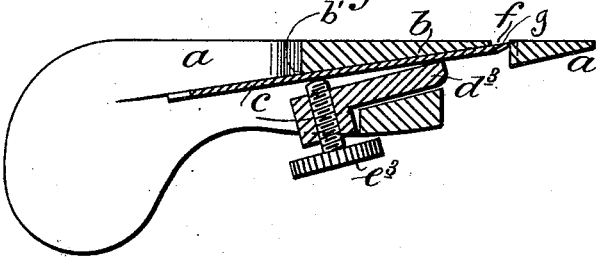

UNITED STATES PATENT OFFICE.

WILLIAM BEDDOWS, OF NOTTINGHAM, ENGLAND.

RABBETING-PLANE.

SPECIFICATION forming part of Letters Patent No. 512,147, dated January 2, 1894.

Application filed August 27, 1892. Serial No. 444,288. (No model.) Patented in England January 28, 1892, No. 1,736.

*To all whom it may concern:*

Be it known that I, WILLIAM BEDDOWS, a subject of the Queen of Great Britain and Ireland, residing at Nottingham, in the county of Nottingham, England, have invented new and useful Improvements in Rabbeting-Planes, (for which I have obtained a patent in Great Britain and Ireland, No. 1,736, bearing date 28th January, 1892,) of which the following is a specification.

My invention relates to improvements in side planes or those planes wherein the cutting edge of the iron or bit lies at the side, as contradistinguished from the bottom of the plane stock, and the object of said invention is to provide a plane of the class mentioned which is adapted to smooth the side walls of narrow grooves, quirks and beveled shoulders in wood work and which is constructed in a novel manner, whereby the edge of the iron or bit will give a clear cut, the iron being firmly bedded, flat, and of a form capable of being sharpened and adjusted in the stock, so as to be used for a long period of time.

To these ends the invention consists in the novel construction and combination of parts hereinafter described and claimed, reference being had to the accompanying drawings, wherein—

Figure 1, is a side elevation of a plane constructed according to my invention. Fig. 2, is an end elevation thereof. Fig. 3 is a cross sectional view taken on the line $x$—$x$ Fig. 1. Fig. 4 is a plan view, the iron or bit and its retaining devices being removed. Figs. 5 and 6, illustrate, respectively, a face and an edge view of the plane iron or bit. Fig. 7 is a detail vertical sectional view of the iron or bit retaining plate. Figs. 8 and 9 are, respectively, plan and end views illustrating a different arrangement. Figs. 10, 11 and 12, illustrate, respectively, plan, edge, and end views of a triangular plane iron or bit. Figs. 13 and 14, illustrate, respectively, a side view and a longitudinal section of a construction particularly adapted for curved work. Fig. 15, is a detail transverse sectional view, illustrating another arrangement. Figs. 15$^a$, 16 and 17, illustrate, respectively, a side elevation, an end view and a plan view of a further different arrangement. Figs. 18 and 19, are sectional views, taken, respectively, on the lines 18—18 and 19—19, Fig. 15$^a$.

In said drawings the reference letter $a$ designates the plane stock or body which is substantially triangular in section and of narrow dimensions transversely or in width and which is provided with a vertical working side face, the width of the upper part of the stock being comparatively large, so as to form a firm and strong bed or support for the iron and to give rigidity to the tool, while the lower part is extremely narrow and may be only one-tenth or one-twentieth of an inch in transverse section, so as to permit its entrance into narrow grooves in wood-work, to plane or smoothen the side walls of such grooves. Said stock is provided with an iron or bit-receiving channel $b$ which extends from the top to the bottom of the stock $a$ in an inclined, forward direction, as best shown in Figs. 1, 13, 15$^a$, and 20, of the drawings, and which also slants laterally, or extends in a transversely inclined direction from its commencing end $b'$ to its finishing end $f$.

In order to employ an iron or bit of flat form and having the advantages above described, in a stock which has an inclined mouth, that is to say, a mouth making any angle say from ten degrees to eighty-nine degrees with the bottom or riding edge of the plane, the iron or bit and its channel or bed are so inclined or canted with respect to the face or side of the plane stock as indicated by the reference letter $b^3$, as to bring the cutting edge of the iron in the mouth when the iron or bit is in place in said channel. This will be better understood by reference to Figs. 1 to 6 and 15 to 19 of the drawings which show stocks with the mouth inclined at angles less than ninety degrees and by reference to Fig. 13, which represents a stock with the mouth at ninety degrees to the bottom or riding edge.

The reference letter $c$ indicates the plane iron or bit having a cutting edge $g$ formed at an angle with the side edge of the said iron or bit, the cutting end being of the same thickness as the remainder of the iron or bit and with a top beveled cutting edge, that is to say, the cutting edge when in place in the mouth slants away from the face, the flat or unbeveled side of the iron being toward the bed, so that a thin or thick shaving may be produced and the acuteness of the cutting edge increased or decreased in sharpening as desired, the shavings being similar to those produced by ordinary surfacing planes in contradistinction to planes for cutting cigar lighters which have an inclined iron in a more or less rectangular stock and are designed to produce a shaving of a special form, and which cannot be used for surfacing, and which is adapted to be placed in and removed from the channel $b$, and when in operative position in said channel its cutting edge lies in the rearwardly inclined finishing end $f$ of said channel.

The mouth $f$, of the stock may be at any desired angle with respect to the bottom edge of the plane, the angle being different according as the plane is intended for surfacing soft, fibrous or hard woods, and as it is desired that the iron shall have a more or less shear cut.

The plane iron or bit $c$ is firmly retained in position in the channel $b$ as illustrated in Figs. 1, 2 and 3, by means of a retaining plate $d$ which lies over the channel $b$ and is provided with a flange $d'$ which bears upon the plane iron or bit $c$ when it is forced in the proper direction by the screw $e$ which passes through an orifice in said plate and has a screw-threaded engagement with the plane stock $a$, as clearly shown.

In Fig. 15, I have shown the retaining plate held in place by a bolt $e'$ passing therethrough and through the stock $a$, a nut $e^2$ engaging the end thereof, by turning which nut the retaining plate is tightened to clamp the plane iron or bit in place, or loosened to permit its removal.

In Figs. 8 and 9, the plane iron or bit $c$ is shown retained in place by means of a wedge $h$, the retaining plate $d$, and its screw or bolt being dispensed with. In this construction the upper part of the stock $a$ is enlarged so as to receive the plane iron or bit and wedge, the wedge being driven into place in the channel to forcibly hold the iron or bit within the channel.

In Figs. 10, 11 and 12 a plane iron or bit $c'$ is shown triangular in cross section so that it will accurately fit and fill the channel $b$, which is also triangular in cross section.

A plane particularly adapted for curved work is illustrated in Figs. 13 and 14 wherein the dimensions of the bottom edge of the stock $a'$ are greatly reduced. In these figures I have also shown a different arrangement of devices for retaining the plane iron or bit in place, that is to say, a retaining lever $j$ and thumb screw $k$, the fulcrum of the lever being a bar, bridge or pivot $l$, fixed to or cast in one piece with the stock $a'$, as shown in section Fig. 14.

In Figs. 15$^a$ to 19, I have shown other means for retaining the plane iron or bit in place, wherein the letter $a$ indicates the plane stock; $b$, the channel and $c$, the plane iron secured in the channel by the retaining block $d^3$ and screw $e^3$ which engages the screw socket in the retaining block $d^3$ and bears at its inner end against the plane iron $c$.

It will be understood that the degree of inclination possessed by the channel $b$ herein described may be varied to suit different conditions without departing from the scope of my invention, and that a side rabbeting plane having a stock wide at the top and narrow at the bottom so as to be capable of entering narrow grooves and yet forming a strong, firm support for a single, flat or triangular section top beveled adjustable iron or cutter, which lies in the bed of the stock which bed is inclined from top to bottom and also slants transversely of the stock and is capable of being easily clamped or secured in position in said bed, may be made with the bottom or riding edge of various lengths according as the tool is intended for straight or curved work, for rough or fine work, and also that the mode or means of clamping the iron or bit may be varied, the wedge as in Figs. 8 and 9 being preferable for deep narrow grooves and the means shown in Figs. 1, 2, 3, 13, 15, 16, 17, and 18 being more desirable for shallow grooves or large work. For this reason three methods of clamping are shown and described. The plane stock is so shaped at its upper part as to be easily held in the hand of the user.

Having thus described my invention, what I claim is—

1. In a plane, the combination with a transversely narrow stock, having a vertical working side face, and provided with a channel which is inclined from top to bottom of the stock and slanted transversely of the stock, and one side wall of which is canted, whereby said channel terminates in a rearwardly inclined opening in the vertical working side face of said stock, of a plane iron located in said channel with its cutting edge lying in a rearwardly inclined direction with respect to the working face of the stock, and means for holding said plane iron in position, substantially as described.

2. In a side rabbet plane, the combination with a channeled plane stock of substantially triangular section and having a slit or mouth in the vertical side face thereof, of a uniform iron or cutter having a top beveled cutting edge angularly to the sides of the iron or cutter, and devices for holding said iron or cutter in position, substantially as described.

In witness whereof I have hereunto signed my name in the presence of two subscribing witnesses.

WILLIAM BEDDOWS.

Witnesses:
  EDW. D. HEARN, Junr.,
    6 *Victoria Street, Nottingham.*
  ISAAC GALE.